Feb. 13, 1934.                C. C. HANCH                1,946,530
                                PISTON
                          Filed Aug. 15, 1928           2 Sheets-Sheet 1
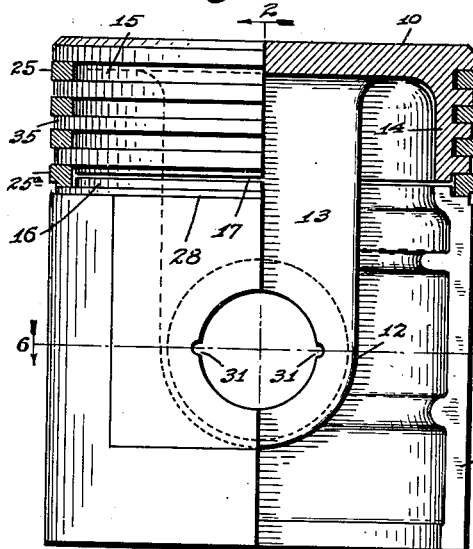
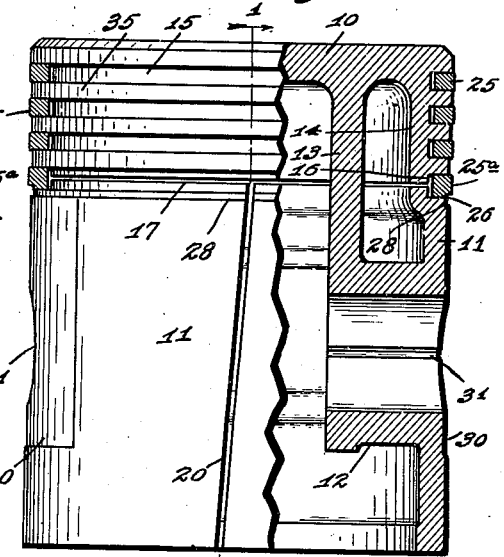
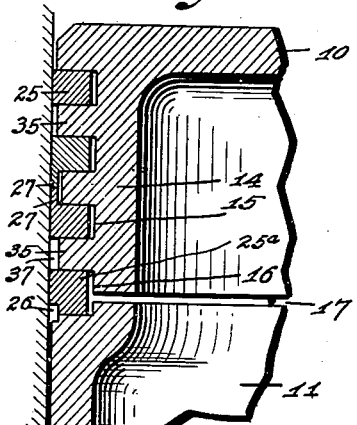
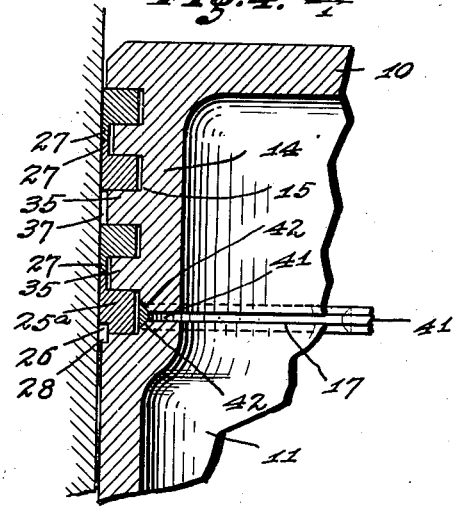
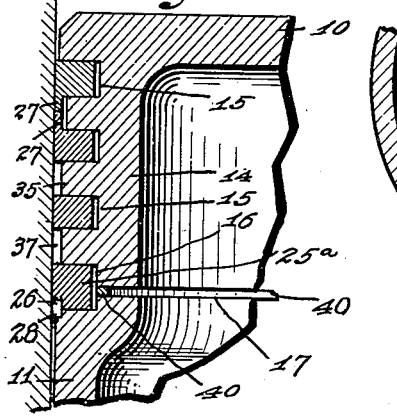
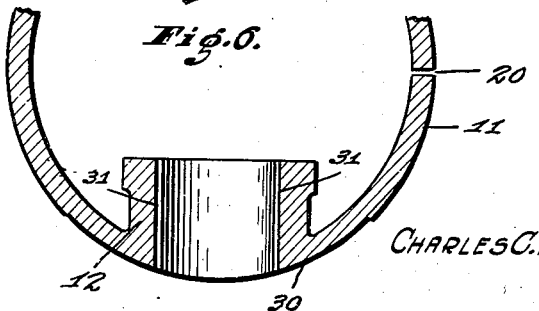
Inventor
CHARLES C. HANCH,
By
Schley & Trask
Attorneys Feb. 13, 1934.  C. C. HANCH  1,946,530
PISTON
Filed Aug. 15, 1928  2 Sheets-Sheet 2
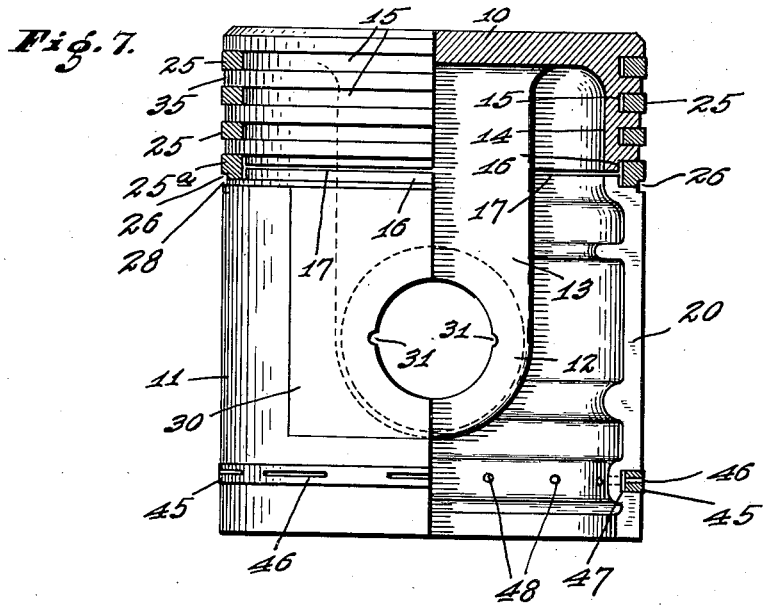
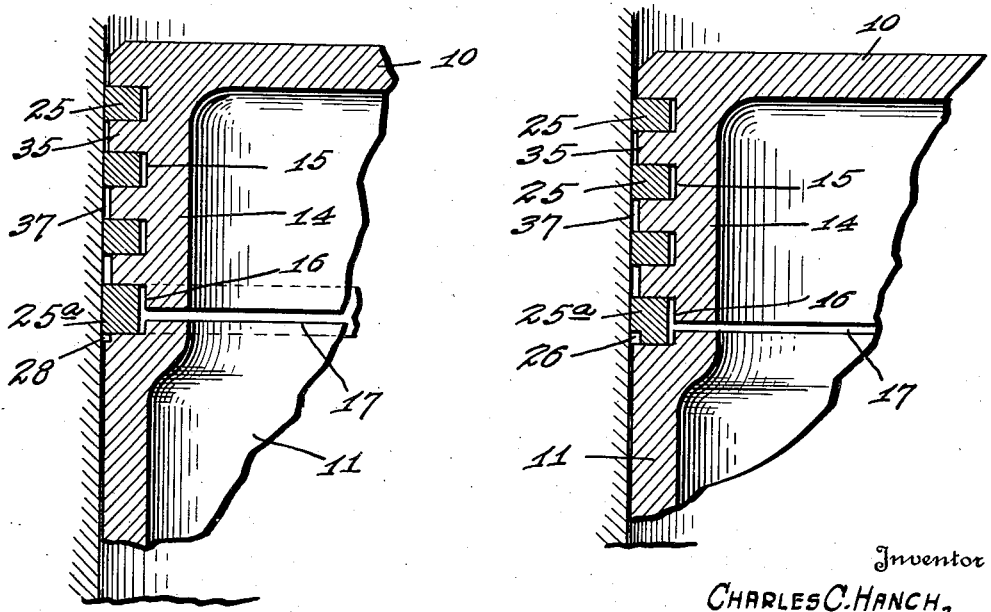
Inventor
CHARLES C. HANCH,
By  Schley & Fresh
Attorneys Patented Feb. 13, 1934

1,946,530

UNITED STATES PATENT OFFICE 1,946,530

PISTON

Charles C. Hanch, Chicago, Ill.

Application August 15, 1928. Serial No. 299,778

3 Claims. (Cl. 309—7)

It is the object of my present invention to provide a piston construction, especially adapted for metals having large co-efficients of expansion, which will operate with ample lubrication and will in fact float on a film of oil in operation; and thus to make possible relatively large clearance, while avoiding piston slap, oil-pumping, and "blow-by."

There has been a considerable tendency in recent years toward the use of aluminum and aluminum alloys in the construction of pistons. These metals have many advantages; but they have the disadvantage of having a greater co-efficient of expansion than has the cast-iron of the cylinder, so that there is a variation in the clearance between the piston and the cylinder as the temperature changes. As a result, in order to reduce such variation in clearance to a large extent, aluminum pistons are frequently made with the skirt portion discontinuous from the ring-carrying portion of the head, at and near the periphery of the piston, by providing an external transverse gap. This however, has ordinarily impaired the lubrication of the piston, by permitting the escape of oil which should be retained between the piston and the cylinder wall for proper lubrication.

My present invention is directed particularly to pistons of this type, in which there is such a transverse gap at the piston periphery between the head and the skirt; and is intended to produce and maintain between such a piston and the cylinder a film of oil on which film the piston floats.

In carrying out my invention, speaking rather generally, I provide a piston which has a head portion and a skirt portion which are separated at the exterior of the piston by a circumferential slit located in the bottom of one of the piston-ring grooves, desirably in the lower groove; connect the head portion and the skirt portion internally of the piston, by suitable mechanical interconnections; make the piston skirt sufficiently flexible so it can yield upon excess inward pressure due to expansion toward the cylinder wall upon rise in temperature; provide in the structure consisting of the piston and lower piston ring a circumferential groove which lies below the aforesaid circumferential slit, and into which groove the lower piston ring acts to scrape oil to a greater or less extent upon the downward stroke of the piston; and provide a superficial reservoir, desirably in the neighborhood of the ends of the piston pin, into which the circumferential groove feeds and from which it may be fed on alternate strokes of the piston; and in addition desirably provide circumferential reservoirs in connection with the lands between piston rings, as by making such lands with considerable clearance from the cylinder wall, the lower lands desirably having greater clearance than have the upper lands.

My present invention has certain features in common with what is shown in my prior Patents No. 1,504,448, of August 12, 1924, No. 1,664,507, of April 3, 1928, and No. 1,667,548, of April 24, 1928; and my present invention is directed to the better obtaining in light-metal pistons, such as aluminum and aluminum-alloy pistons, of the desirable results which are obtained by the structures set forth in such prior patents.

The accompanying drawings illustrate my invention: Fig. 1 is a partial elevation and partial longitudinal section on the line 1—1 of Fig. 2 of a simple form of piston embodying my invention, the view being taken looking at the end of the piston pin; Fig. 2 is a partial elevation of the piston shown in Fig. 1, and a partial section on the line 2—2 of Fig. 1; Figs. 3, 4, and 5 are enlarged fragmentary sections corresponding generally to the upper left-hand corners of Figs. 1 and 2, but showing slightly different arrangements of piston-rings from that shown in Figs. 1 and 2, Figs. 4 and 5 showing in addition certain supplemental closing devices for the circumferential slit between the head and the skirt of the piston; Fig. 6 is a fragmentary transverse section on the line 6—6 of Fig. 1; Fig. 7 is a partial elevation and partial longitudinal section of a slightly different form of piston, in which there is a scavenging ring near the bottom of the piston skirt, in addition to the other piston-rings provided; and Figs. 8 and 9 are fragmentary sections generally similar to Figs. 4 and 5, but with the circumferential oil-carrying groove provided only in the piston skirt in Fig. 8 and only in the lower piston ring in Fig. 9, instead of partially in the skirt and partially in the lower piston-ring as in Figs. 1 to 5 inclusive.

The piston in connection with which I have illustrated my invention has a head 10, a skirt 11, and piston-pin bosses 12; and has the inner end of the piston-pin bosses 12 connected to the head 10 by struts or posts 13 which extend generally longitudinally of the piston to the head and join the latter at regions removed from the periphery of the head, as is clear from Figs. 1, 2, and 7. The head 10, the struts or posts 13, the piston-pin bosses 12, and the skirts 11 are desirably all parts of a single casting, usually of aluminum or aluminum alloy, and are so shown although that is not essential to my invention in its broader aspects. The head 10 is provided with a depending ring-belt 14, provided with a plurality of piston-ring grooves 15, here illustrated as three in number. In addition, there is another piston-ring groove 16, here shown as the fourth groove, which is partly in the ring-belt 14 and partly in the upper end of the skirt portion 11. At the bottom of this additional piston-ring groove 16 is a circumferential slit 17, which constitutes the gap which separates the head from the skirt at the periphery and outer portion of the piston. That is, the skirt 11 and the ring-belt 14 are discontinuous from each other at and near the piston periphery; and the head 10 and the skirt 11 are interconnected only by some internal mechanical connection, here shown as the posts or struts 13 which spring from the head 10 and join the inner end of the piston-pin bosses 12 whose outer ends join the skirt 11. By reason of the circumferential slit 17, it becomes possible for the skirt 11 and the ring-belt 14 to have different expansions, without producing stresses acting directly between them.

The skirt 11 is provided with one or more generally longitudinal slots 20, which extends from the lower edge of the piston skirt to the circumferential slit 17. I prefer only one such slot, as is illustrated in Fig. 2; and locate that slot substantially 90° circumferentially of the piston from the axis of the piston pin, on the side of the piston opposite that which receives the transverse component of the thrust of the connecting-rod on the explosion stroke. The slot 20 is desirably slightly oblique to the vertical to avoid scoring of the cylinder wall. The slot or slots 20 provide a certain flexibility in the piston skirt, permitting resilient yielding inward of the parts adjacent to the slot or slots as the piston skirt expands toward the cylinder wall upon increase in temperature and a slight springing outward as there is contraction of the piston with relation to the cylinder wall.

In the piston-ring grooves 15 and 16 are piston-rings 25. These may take various styles. There may be four plain rings as illustrated in Fig. 8. There may be three plain rings in the piston-ring grooves 15, and an oil-control ring 25ᵃ in the piston-ring groove 16, as illustrated in Figs. 1, 2, 3, 4, 5, 7 and 9; the oil-control ring as shown, being provided at its lower outer corner with a circumferential rabbet 26. If desired, any two adjacent rings may be made into a pair, with peripheral flanges 27 extending toward and substantially into contact with each other, (the so-called "tongue-tight" structure,) as shown for the two middle piston rings in Fig. 3, the upper pair of piston rings in Fig. 5, and both the lower pair and the upper pair of piston rings in Fig. 4. In the last case mentioned, the lower piston ring not only has a circumferential flange 27 projecting upward towards the next higher piston ring, but in addition has at its lower outer corner a circumferential rabbet 26; which is a new construction of piston ring so far as I am aware.

Just below the piston-ring groove 16, the skirt 11 may be provided with a circumferential rabbet 28, which opens into such piston-ring groove 16.

Thus, just below the lower cylinder-engaging corner of the lower piston ring there is a circumferential groove, which may be provided either by the rabbet 26 in the lower piston ring, or by the rabbet 28 in the subjacent corner of the piston skirt, or by the two rabbets 26 and 28 in the piston-ring and skirt acting together. This circumferential groove 26, 28, or 26—28, is a circumferential oil passage, which is capable of carrying oil circumferentially to and from superficial reservoirs 30, which conveniently are provided as reliefs on the cylindrical skirt in the regions of the ends of the piston pins. These relief portions extend upward to the circumferential groove just referred to, and extend downward substantially to the bottom of the piston-pin bosses; but desirably do not extend downward as far as the lower end of the skirt 11, so that they may not spill their contents. Thus the piston below the reservoirs 30 is desirably substantially circular without relief, as is plain from Figs. 1, 2, and 7.

Desirably there is provided a restrained relief from the reservoirs 30, as by small grooves 31 in the piston-pin bearing surfaces of the inside of the piston bosses. These not only provide a restrained relief, but also provide effectually for lubrication of the piston-pin.

The circumferentially exposed lands 35 between piston-rings are either completely or partially spaced with a sufficient clearance from the cylinder wall to provide reservoirs 37. The simplest way of obtaining this result is by having the lands flat in the manner shown in some detail in my aforesaid prior Patent No. 1,667,548. If there are several such exposed lands, those farther from the explosion chamber are generally provided with larger clearances than those nearer the explosion chamber.

In operation, a film of oil is maintained between the piston skirt and the cylinder. This is ordinarily supplied to the cylinder wall in the usual manner, by splashing from the crank case; and is fed upward along the piston as the latter moves downward. During this downward movement of the piston, the lower piston ring, especially if it is an oil-control ring with a rabbet 26, scrapes oil from the cylinder wall into the circumferential groove formed by the rabbet 26, the rabbet 28, or the rabbet 26—28; and such oil is fed circumferentially around the pistons and into the superficial reservoirs 30. Some of this oil passes through the restricted grooves 31 to lubricate the piston pin. On the upward stroke of the piston, the oil is fed back from the superficial reservoirs into the clearance space between the piston and the cylinder. There is also some catching and retaining of oil in the clearance spaces 37 at the lands between piston rings. This results in a floating of the piston on a film of oil, producing effective lubrication with a substantial avoidance of piston slaps, even though the clearance space is fairly wide. The oil for this film is prevented from being lost by the substantial closure of the slit 17 by the piston ring in the piston-ring groove 16; but such circumferential slit allows any necessary relative movement between the piston head and the skirt 11, and especially between the ring belt 14 and the skirt 11, due to unequal expansions resulting from unequal temperature changes in the head and skirt. Thus the skirt is not too greatly affected by the expansion and contraction of the cylinder head; and can yield inwards and spring outwards as required to conform to the cylinder wall with proper clearance between. This yielding is facilitated by the longitudinal slit or slits 20, which provide sufficient flexibility in the skirt for this purpose.

If desired, the slit 17 may have a supplemental closing device, to assist the piston-ring in the groove 16 in its action of preventing loss of oil through the slit 17. Such supplemental closing device may take the form of a thin ring 40 of rectangular cross-section, fitting tight in the slit 17, as is illustrated in Fig. 5, or any other suitable form. This is found to be very effective. Instead of the ring 40 of rectangular cross-section, a ring 41 having a cross-section of the frustum of the wedge may be provided, as is illustrated in Fig. 4, in which case, the outer corners of the slit 17 are desirably beveled to provide conical faces 42, which co-operate with the conical faces of the ring 41 of wedge-shaped cross-section. With either form of slit-closing ring, of rectangular cross-section as is the ring 40 or of wedge-shaped cross-section as is the ring 41, the surfaces of the ring which co-operate with and abut against the adjacent faces on the ring-belt 14 and skirt 11 may slide on such surfaces without breaking contact therewith and thus affecting the slit-closing action of the ring on the outer edge of the slit 17.

I prefer a piston construction, such as is illustrated in Fig. 1 and 2, in which there are no rings save those at the upper end of the piston, in the ring-grooves 15 and 16. However, it is sometimes desired to use pistons which have scavenging rings at the lower end. Such a scavenging ring may be provided, for example, as illustrated in Fig. 7. Here there is a scavenging ring 45 near the lower end of the piston skirt. This scavenging ring is desirably provided with scavenging slits 46, as shown in the right-hand half of Fig. 7; and is desirably located in a ring-groove 47 which has small drain holes 48 extending through to the interior of the piston. When such a scavenging ring 45 is used, as for instance when there is a tendency to an excess amount of oil, the excess oil is scraped off by the scavenging ring 45, either at its lower corner or through the slits 46, and drains back into the crank-case. This cuts down the thickness of the film of oil between the main part of the piston and the cylinder wall, and may be used where there is a tendency to provide too much oil for that film. By controlling the size and number of the drain holes 48, the amount of scavenging by the ring 45 may be set as desired, thus controlling the amount of oil which is supplied to the film above the ring 45. However, as already stated, I prefer a construction in which no scavenging ring is used at the lower end of the piston.

I claim as my invention:

1. A piston for internal combustion engines, comprising a head portion and a skirt portion which are separated at the exterior of the piston by a circumferential slit but are interconnected internally of the piston, said piston having a piston-ring groove in the bottom of which said circumferential slit opens so that a piston ring in said groove obstructs the opening of said circumferential slit to the exterior of the piston, a wedge-shaped slit-closing ring located beneath said piston ring for substantially closing said circumferential slit; said piston being provided below the lower cylinder-engaging corner of said piston ring with a circumferential groove into which said piston ring scrapes oil on the downward piston-stroke, and also being provided with a superficial reservoir with which said circumferential groove communicates.

2. A piston for internal combustion engines, comprising a head portion and a skirt portion separated at the exterior of the piston by a circumferential slit but connected internally of the piston, said piston having a piston-ring groove in the bottom of which said circumferential slit opens so that a ring in said groove obstructs the opening of said slit to the exterior of the piston, a slit-closing ring located in said slit for substantially closing it, said slit-closing ring slidably engaging the walls of said slit to permit unequal expansions of the head-portion and skirt-portion of the piston, said piston being provided with superficial oil-containing provisions including a circumferential oil groove at the lower corner of said ring groove and positioned to receive oil scraped from a cylinder wall by a ring in said ring groove.

3. The invention set forth in claim 2 with the addition that the skirt portion of said piston is provided exteriorly with a superficial oil reservoir communicating at its top with said circumferential oil groove and extending downwardly of said skirt portion, said skirt portion also having a restricted oil passage extending through its wall below said circumferential oil groove and providing communication between the interior of the skirt portion and said reservoir.

CHARLES C. HANCH.